United States Patent
Elser et al.

(12) 
(10) Patent No.: US 6,474,437 B1
(45) Date of Patent: Nov. 5, 2002

(54) POWER-ASSISTED STEERING WITH HYDRAULIC POWER ASSISTANCE

(75) Inventors: Dieter Elser, Essingen; Andreas Braun; Wolfgang Zeitz, both of Schwaebisch Gmuend, all of (DE)

(73) Assignee: ZF Lenksysteme GmbH, Schwaebisch Gmuend (DE)

(*) Notice: Subject to any disclaimer, the term of this patent is extended or adjusted under 35 U.S.C. 154(b) by 0 days.

(21) Appl. No.: 09/720,763

(22) PCT Filed: Jun. 26, 1999

(86) PCT No.: PCT/EP99/04445

§ 371 (c)(1), (2), (4) Date: Mar. 5, 2001

(87) PCT Pub. No.: WO00/01568

PCT Pub. Date: Jan. 13, 2000

(30) Foreign Application Priority Data

Jul. 2, 1998 (DE) .......................... 198 29 531

(51) Int. Cl.$^7$ ............................... B62D 5/06
(52) U.S. Cl. ....................... 180/422; 180/406
(58) Field of Search ................. 180/417, 421, 180/422, 423, 405, 406

(56) References Cited

U.S. PATENT DOCUMENTS

| | | | | |
|---|---|---|---|---|
| 5,080,186 A | * | 1/1992 | Elser et al. ............ | 180/407 |
| 5,267,627 A | * | 12/1993 | Frank et al. ............ | 180/422 |
| 5,553,683 A | | 9/1996 | Wenzel et al. | |
| 6,047,788 A | * | 4/2000 | Bohner et al. ............ | 180/406 |
| 6,076,627 A | * | 6/2000 | Bohner et al. ............ | 180/403 |
| 6,193,009 B1 | * | 2/2001 | Chino et al. .......... | 137/599.01 |
| 6,230,839 B1 | * | 5/2001 | Elser et al. ................ | 180/417 |

FOREIGN PATENT DOCUMENTS

| | | | | |
|---|---|---|---|---|
| DE | 38 09 192 | 9/1988 | | |
| DE | 40 25 697 | 2/1992 | | |
| DE | 42 41 849 | 6/1994 | | |
| DE | 43 30 159 | 11/1994 | | |
| DE | 44 33 750 | 12/1995 | | |
| DE | 195 33 152 | 3/1997 | | |
| DE | 197 17 796 A1 | * 10/1998 | ............ | B62D/5/06 |
| EP | 0 440 638 | 9/1992 | | |

* cited by examiner

*Primary Examiner*—Kevin Hurley
(74) *Attorney, Agent, or Firm*—Kenyon & Kenyon

(57) ABSTRACT

In a power steering system having hydraulic power support for motor vehicles, a steering gear shaft having a steering wheel is connected to an input element of a steering gear. An output element of the steering gear is connected to wheels of the vehicle to be steered. Two working chambers of a servo motor of a power boosting system can be supplied with a hydraulic medium from a servo pump through a steering valve in accordance with a torque applied in the area of the steering gear shaft input element. Two sensors for detecting an angle of rotation and a torque are provided on the steering gear shaft and on the output element of the steering gear accordingly. After the steering wheel has been released after a steering operation, the wheels to be steered and the steering gear can be returned with hydraulic support. Both the intensity and direction of the hydraulic power support as well as the returning of the wheels to be steered are controlled by a common, electronically controlled electromagnetic valve. In addition, only one steering force sensor and/or torque sensor is provided for detecting the steering force. With this sensor, the control distances can be reduced greatly, thus yielding a high steering accuracy.

11 Claims, 2 Drawing Sheets

POWER-ASSISTED STEERING WITH HYDRAULIC POWER ASSISTANCE

FIELD OF THE INVENTION

The present invention relates to a power steering system having hydraulic power support for motor vehicles. A steering gear shaft having a steering wheel is connected to an input element of a steering gear. An output element of the steering gear is connected to wheels of the vehicle to be steered. Two working chambers of a servo motor of a power boosting device may be acted upon by a servo pump having hydraulic media according to an applied torque in the area of the steering gear shaft/input element. At least one sensor for detecting an angle of rotation and a torque is mounted on the steering gear shaft. A sensor for detecting a steering angle is arranged on the output element of the steering gear. This sensor may also be integrated into the angle of rotation sensors of the steering gear shaft. A return device is used for hydraulic support in returning the steering gear and the wheels to be steered after the steering wheel is released after a steering operation.

BACKGROUND INFORMATION

Such a power steering system is described in European published Patent Application Ser. No. 0440 638, where in addition to a complete power steering system having hydraulic power support, there is also an electric motor which is used to influence, as a function of various parameters, the reaction force detectable on the steering wheel. In addition, the electric motor is used to center the steering valve exactly at its center. Finally, a hydraulic steering axis can be returned with the electric motor by shifting the steering valve beyond its neutral position into a control position which corresponds to a reversal of the direction of steering after the steering wheel is released.

SUMMARY

An object of the present invention is to implement the positive properties achieved with the known power steering system such as accurate valve centering and hydraulic steering axis return by simpler means without the use of an electric motor. In addition, steering accuracy is also to be improved.

The above and other beneficial objects of the present invention are providing a achieved the power steering system in which both the intensity and direction of the hydraulic power support as well as the returning of the wheels to be steered are controlled by a common electronically controlled electromagnetic valve. This electromagnetic valve may be integrated into the actual power steering system or arranged at any location outside the steering system. In addition, a torsion spring may be eliminated due to the arrangement of the steering force sensor and/or torque sensor for detecting the steering force. Extremely small control distances may be implemented with the steering force sensor and/or torque sensor, so that a high steering accuracy is achieved. The auxiliary power for the hydraulic power support is supplied exclusively by the servo pump. No electric motor is needed.

To prevent any danger in the event that an error occurs, a short-circuit valve is arranged between the steering gear shaft and the input element of the steering gear. The steering valve is otherwise located at this point in the conventional power steering systems. The short-circuit valve is designed as a rotary slide valve with a closed center, so that no connection between the two working chambers of the servo motor is possible in its neutral position. Only when an error occurs is the short-circuit valve switched to its open position so that the two working chambers of the servo motor are connected. The two working chambers are then short-circuited, so no pressure can build up in the servo motor. In this case, the steering force is obtained exclusively by mechanical operation of the steering wheel. The electromagnetic valve may be controlled easily by an electronic unit as a function of at least one parameter, such as the speed of the vehicle, the steering rate, the yaw rate, The above and other beneficial objects of the present invention are providing a. the vehicle load, the vehicle acceleration etc.

Through appropriate programing of the electronic unit and appropriate sensors, the electromagnetic valve may be controlled by signals providing information about the instantaneous position of the vehicle and desired future positions. Thus, this includes the option for automatic steering in the power steering system.

The steering force sensor and/or torque sensor may be designed as a pressure sensor or as a piezoelectric element. With such elements, the control distance may be reduced to 0 to 0.1 degree.

Figure 1:
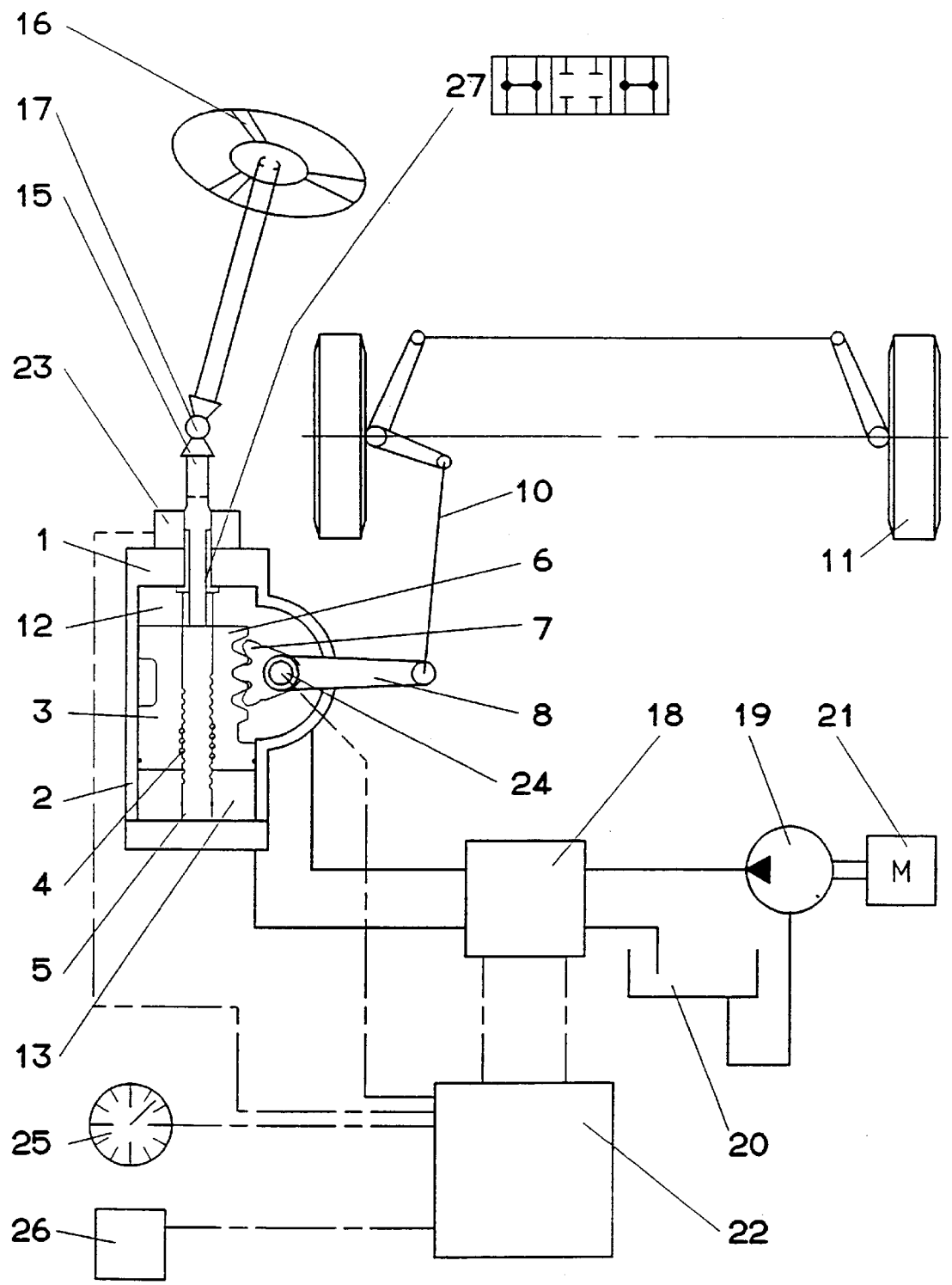
FIG. 1 is a cross-sectional view of a first example embodiment of a power steering system according to the present invention.

The present invention is explained with reference to a ball and nut power steering system. However, the present invention may also be applied to rack and pinion power steering systems.

In a steering box 1, a steering gear 2 contains a working piston 3, which is in a drive connection with a threaded spindle 5 via a ball row 4 and with a segmented shaft 7 via gear teeth 6. Threaded spindle 5 forms an input element of steering gear 2, and segmented shaft 7 forms an output element of steering gear 2. There is a connection from segmented shaft 7 to at least two wheels 11 to be steered on the motor vehicle, the connection being provided by a drop arm 8 and a steering linkage 10.

Housing 1 forms two cylindrical working chambers 12 and 13, which are separated by working piston 3.

Threaded spindle 5, as the input element of steering gear 2, is connected to a steering gear shaft 15, which supports a steering wheel 16. Instead of a torsion spring, a steering force sensor and/or torque sensor 23 is used in steering gear shaft 15. Steering gear shaft 15 may be subdivided by a universal joint 17.

By way of electromagnetic valve 18, e.g., a proportional valve, the two working chambers 12 and 13, may be supplied with a hydraulic medium delivered from a container 20 by a servo pump 19. Servo pump 19 may be driven by a vehicle engine 21, for example, or by an electric motor.

Electromagnetic valve 18 may be designed with an open or closed center. In an embodiment with a closed center, a hydraulic medium reservoir (not shown) is provided in addition to servo pump 19.

Electromagnetic valve 18 is controlled by an electronic unit 22. Electronic unit 22 receives signals from at least one first sensor for detecting an angle of rotation and a torque in the form of steering force sensor and/or torque sensor 23 arranged on steering gear shaft 15. A second sensor 24 for detecting a steering angle is arranged on the output element, segmented shaft 7 of steering gear 2, and supplies the corresponding signals to electronic unit 22. The sensor may alternatively be arranged on the input element of steering gear 2 with the same effect. Additional signals which reflect parameters for the prevailing status of the vehicle are sent to electronic unit 22 by an electronic tachometer 25 and a yaw rate sensor 26, for example.

In the example embodiment of the present invention illustrated in FIG. 1, a short-circuit valve 27 is used, for example, between steering gear shaft 15 and the input element of steering gear 2, i.e., threaded spindle This is illustrated schematically in FIG. 1. Short-circuit valve 27 may open when a torque is applied in the area of steering gear shaft 15/threaded spindle 5, which corresponds to an operating force of just under 450 N. According to an EEC directive, such an operating force is permitted in the event of a fault in a power steering system. Due to the opening of short-circuit valve 27, working chambers 12 and 13 are connected so pressure cannot build up in working chambers 12 and 13 of steering gear 2. In this case, steering gear 2 is adjusted only by the manual force of the steering wheel.

By appropriate programing of electronic unit 22, the power steering system may be designed for automatic steering. Signals may be sent to electronic unit 22 from a controlling system arranged outside the vehicle. The controlling system may be equipped with an induction cable in the roadway, for example. Video orientation or satellite control is also possible. The signals provide information regarding the instantaneous position of the vehicle and regarding desired future positions. Then the setpoint/actual value deviations are detected by electronic unit 22, and suitably corrected control commands are relayed to electromagnetic valve 18. The driver may disable the automatic steering by operating steering wheel 16.

Figure 2:
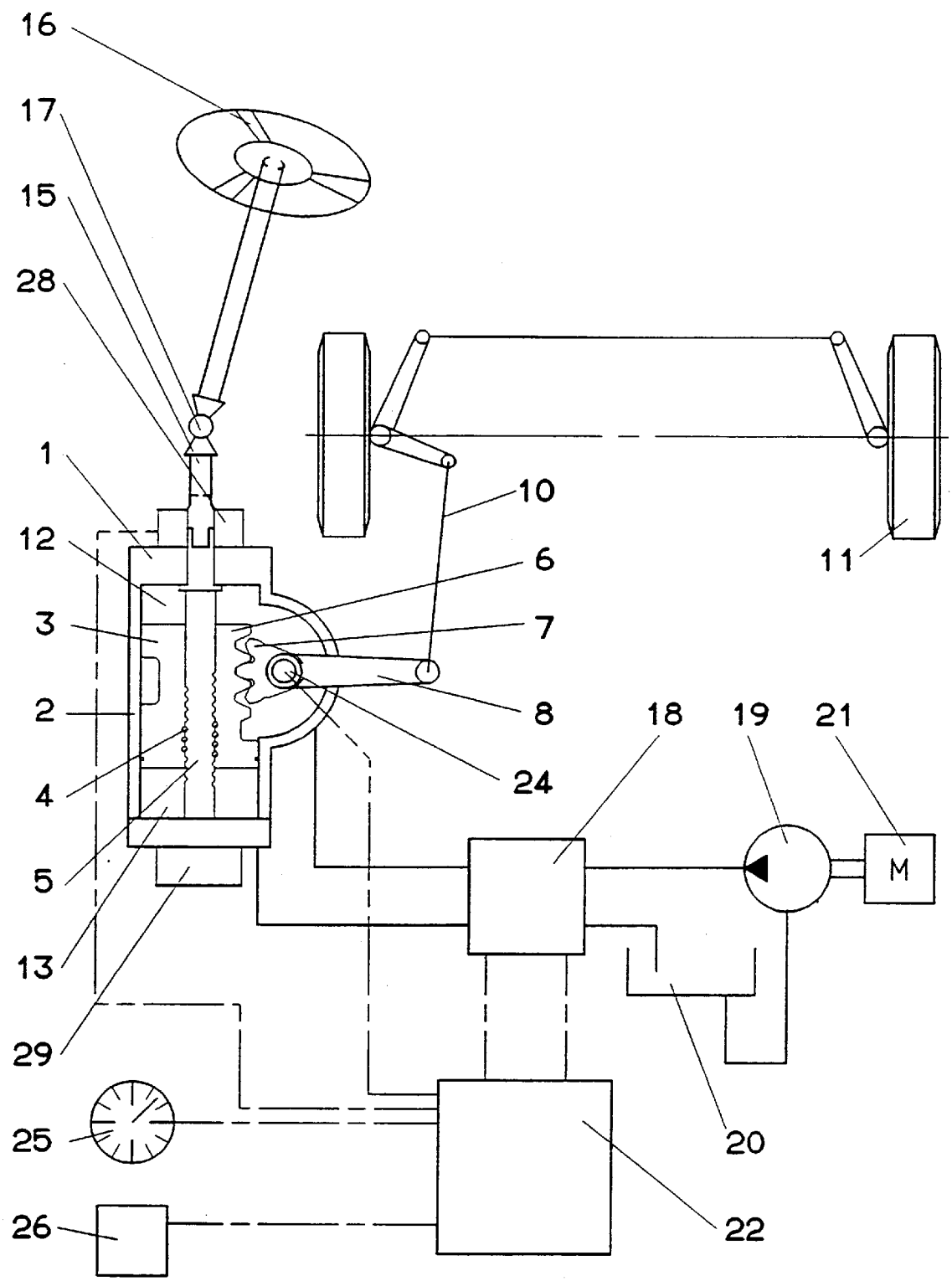
FIG. 2 is a cross-sectional view of a second example embodiment of a power steering system according to the present invention.

In the second example embodiment of the present invention illustrated in FIG. 2, the short-circuit valve is integrated into electromagnetic valve 18. In this case, the short-circuit valve may be controlled electronically together with electromagnetic valve 18.

In this example embodiment, the first sensor is designed as a torque sensor 28. An angle of rotation sensor 29 is mounted on the lower end of steering housing 1, coupled to threaded spindle 5. With this additional angle of rotation sensor 29, the angular resolution of the second sensor 24 mounted on the segmented shaft 7 may be improved. The other components of the second embodiment correspond to those of the first embodiment and are labeled with the same reference numbers.

A steering movement of steering wheel 16 is detected by angle of rotation sensor 28 on steering gear shaft 15. The steering movement is transmitted from steering gear shaft 15 over steering force sensor and/or torque sensor 23, which is then loaded as a function of the operating moment. Steering force sensor and/or torque sensor 23 is mounted on a radial extension of threaded spindle 5. Steering force sensor and/or torque sensor 23 may be designed as a piezoelectric element. Likewise, some other pressure sensor may also assume the function of steering force sensor and/or torque sensor 23.

The steering angle signal and the torque signal are analyzed by electronic unit 22. Electronic unit 22 then controls an oil flow from pump 19 over electromagnetic valve 18 to the corresponding working chambers 12 and 13 in accordance with the proper direction of rotation. The second sensor 24 on the segmented shaft 7 has a total angle sweep of only approximately 90 degrees and therefore the resolution of the sensor is relatively inaccurate, so a speed-transforming gear would have to be connected upstream from it. Angle of rotation sensor 29 which revolves together with threaded spindle 5 is used instead of such a complicated speed-transforming gear.

Both torque sensor 28 and angle of rotation sensor 29 as well as the first and second sensors 23, 24 on segmented shaft 7 and electronic unit 22 are designed with redundancy. This redundancy involving the sensors and the electronic unit makes it possible to detect errors and deactivate the hydraulic support of steering gear 2 over the electronically driven short-circuit valve integrated into electromagnetic valve 18.

What is claimed is:

1. A power steering system for a motor vehicle, the power steering system having hydraulic power support, the motor vehicle including a in steering wheel and wheels to be steered, the power steering system comprising:

a steering gear having an input element and an output element, the output element being connected to the wheels to be steered;

a steering gear shaft connected to the steering wheel and to the input element of the steering gear;

a steering valve;

a servo pump;

a power boosting system including a servo motor having two working chambers, the servo pump supplying a hydraulic fluid to the two working chambers through the steering valve in response to a torque applied to at least one of the steering gear shaft and the input element;

at least one first sensor arranged on the steering gear shaft, the at least one first sensor being configured to detect at least one of an angle of rotation and a torque;

a second sensor mounted on one of the output element and the input element, the second sensor being configured to detect a steering angle;

a returning device configured to provide hydraulic power support to return the steering gear and the wheels to be steered after the steering wheel is released after a steering operation; and a common, electronically controlled electromagnetic valve configured to control an intensity and a direction of the hydraulic power support and the returning of the wheels to be steered;

wherein the at least one first sensor includes a single steering force sensor configured to detect a steering force, the steering force sensor including at least one of a force sensor and a torque sensor.

2. The power steering system according to claim 1, further comprising a short-circuit valve disposed between the steering gear shaft and the input element of the steering gear.

3. The power steering system according to claim 2, wherein the short-circuit valve connects the two working chambers of the servo motor when the short-circuit valve is in an open position.

4. The power steering system according to claim 1, further comprising an electronic unit configured to control the electromagnetic valve as a function of at least one parameter.

5. The power steering system according to claim 4, wherein the at least one parameter includes at least one of a vehicle speed, a steering rate, a yaw rate and a vehicle load.

6. The power steering system according to claim 1, further comprising a hydraulic fluid reservoir, and wherein the electromagnetic valve includes a closed center.

7. The power steering system according to claim 2, wherein the short-circuit valve is integrated with the electromagnetic valve, the short-circuit valve being electronically controllable.

8. The power steering system according to claim 7, further comprising a third sensor arranged on the input element of the steering gear, the third sensor being configured to detect an angle of rotation.

9. The power steering system according to claim 1, wherein the electronic unit and each sensor are provided redundantly.

10. The power steering system according to claim 1, wherein the electromagnetic valve includes a proportional valve.

11. The power steering system according to claim 1, wherein the single steering force sensor includes a piezoelectric element.

* * * * *